United States Patent
Imoto (10) Patent No.: US 7,508,440 B2
(45) Date of Patent: Mar. 24, 2009

(54) IMAGING DEVICE AND VEHICLE CIRCUMFERENCE VISUALIZING APPARATUS

(75) Inventor: Masayoshi Imoto, Aichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 1151 days.

(21) Appl. No.: 10/658,764

(22) Filed: Sep. 10, 2003

(65) Prior Publication Data

US 2004/0046889 A1 Mar. 11, 2004

(30) Foreign Application Priority Data

Sep. 10, 2002 (JP) .............................. 2002-263826

(51) Int. Cl.
*H04N 5/225* (2006.01)
*H04N 7/18* (2006.01)
(52) U.S. Cl. ..................... 348/335; 348/148; 340/435
(58) Field of Classification Search ................. 348/148, 348/335
See application file for complete search history.

(56) References Cited

U.S. PATENT DOCUMENTS

| 5,499,142 A | * | 3/1996 | Ohshita | ...................... 359/773 |
| 6,166,764 A | * | 12/2000 | Sakata | .......................... 348/148 |
| 6,185,045 B1 | * | 2/2001 | Hanano | ........................ 359/631 |
| 7,359,001 B2 | * | 4/2008 | Imoto | ........................... 348/373 |
| 2001/0028393 A1 | * | 10/2001 | Tomida et al. | ............... 348/207 |

FOREIGN PATENT DOCUMENTS

| JP | U-57-069360 | 4/1982 |
| JP | A-6-344827 | 12/1994 |
| JP | U-3063778 | 9/1999 |
| JP | A-11-338074 | 12/1999 |
| JP | A 2000-89301 | 3/2000 |
| JP | A-2001-114048 | 4/2001 |
| JP | A-2001-309213 | 11/2001 |
| JP | A-2002-067793 | 3/2002 |
| JP | A-2003-510666 | 3/2003 |

* cited by examiner

*Primary Examiner*—Sinh N Tran
*Assistant Examiner*—Hung H Lam
(74) *Attorney, Agent, or Firm*—Oliff & Berridge, PLC (57) ABSTRACT

An imaging device has a single image pickup element, an image pickup lens arranged in front of the image pickup element, a first optical element having a concave lens property and arranged in front of the image pickup lens, and a second optical elements having no concave lens property and arranged in front of the image pickup lens. The first optical element guides light from a wide angle range in a forward slanting lower side direction onto the image pickup lens, and forms the light as an image in the image pickup element via the image pickup lens. The second optical elements guide lights from non-wide angle ranges in both left and right side directions onto the image pickup lens, and form these lights as images in the image pickup element via the image pickup lens.

18 Claims, 7 Drawing Sheets

VISUAL FIELD DIRECTION ON FORWARD SLANTING LOWER SIDE

VISUAL FIELD DIRECTION ON FORWARD SLANTING LOWER SIDE

FIG. 12
Prior Art

IMAGING DEVICE AND VEHICLE CIRCUMFERENCE VISUALIZING APPARATUS

BACKGROUND OF THE INVENTION

1. Field of the Invention

The present invention relates to an imaging device for simultaneously picking up images in plural visual field directions by a single image pickup element, and a vehicle circumference visualizing apparatus using the imaging device.

2. Description of the Related Art

Figure 11:
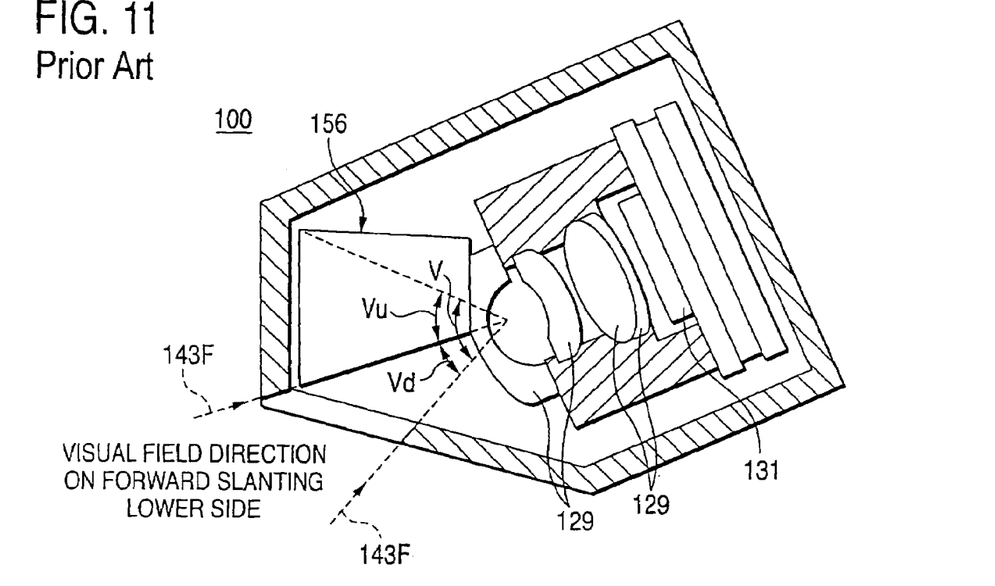
FIG. 11 is a XI-XI sectional view (schematic sectional side view of the conventional imaging device) shown in FIG. 12.
Figure 12:
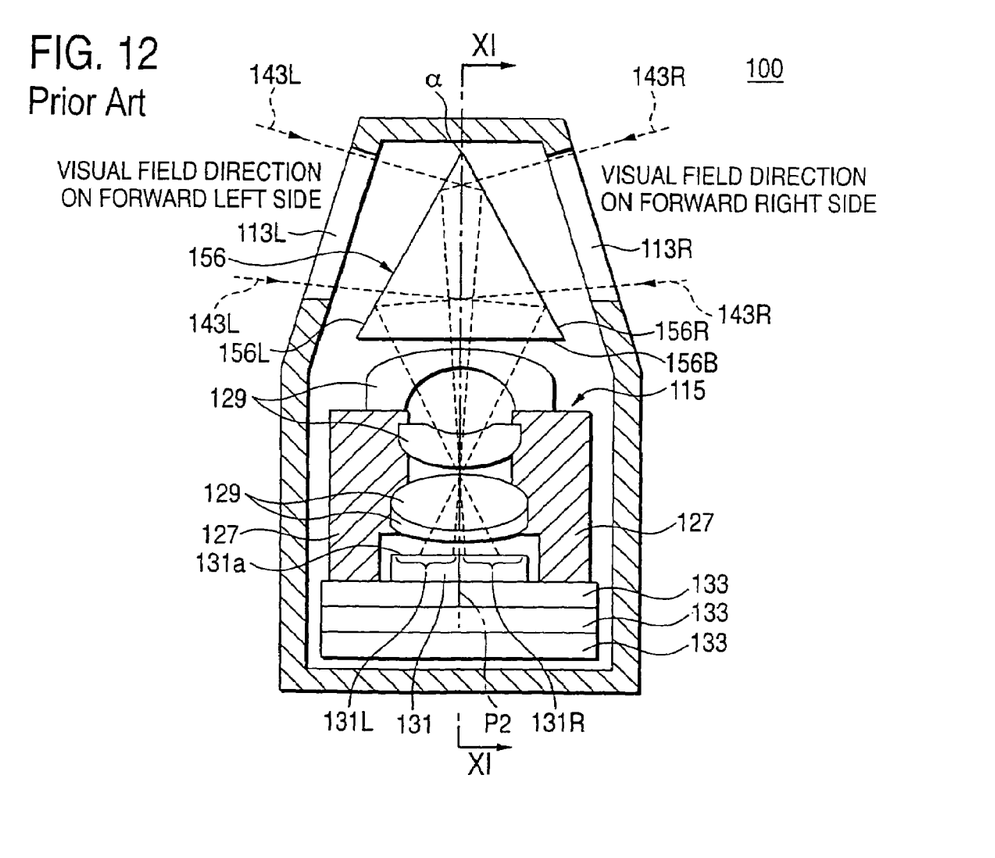
FIG. 12 is a schematic sectional plan view of a conventional imaging device.

Conventionally, a device for simultaneously picking up images by an single image pickup element in three visual field directions on both forward left and forward right sides, and the forward slanting lower side of the imaging device is known (See JP-A-2000-089301). FIGS. 11 and 12 respectively show a schematic sectional side view (XI-XI sectional view of FIG. 12) and a schematic sectional plan view of the conventional imaging device.

In the conventional imaging device 100, an image pickup lens 129 is arranged in front of a single image pickup element 131. A prism 156 of a triangle pole shape is arranged in the upper side area (shown by a symbol "Vu" in FIG. 11) of a vertical view angle (shown by a symbol "V" in FIG. 11) of the image pickup lens 129 on a front side of the image pickup lens 129. Lights from the visual field directions on both the forward left and right sides (shown by symbols "143L" and "143R", respectively in FIG. 12) of the imaging device 100 are reflected on the image pickup lens 129 side by the prism 156, and pass through the upper side area Vu of the vertical view angle V of the image pickup lens 129, and are incident to the image pickup lens 129. These lights 143L, 143R are then formed as images in the image pickup element 131 through the image pickup lens 129. Light from the visual field direction on the forward slanting lower side of the imaging device 100 (shown by a symbol "143F" in FIG. 11) passes through the lower side area (shown by a symbol "Vd" in FIG. 11) of the vertical view angle V of the image pickup lens 129 and is directly incident to the image pickup lens 129, and is formed as an image in the image pickup element 131 through the image pickup lens 129. Thus, the images are simultaneously picked up by the single image pickup element 131 in the three visual field directions on both the forward left and right sides and the forward slanting lower side of the imaging device 100.

When the imaging device 100 of the kind is used in a vehicle circumference visualizing apparatus, the imaging device 100 is arranged in the vehicle front portion and picks up images of dead areas (blind corners) in the three directions constructed by both the forward left and right side directions and the forward slanting lower side direction of the vehicle. In a case above, it is desirable to pick up the image in the forward slanting lower side direction of the vehicle (i.e., the visual field direction on the forward slanting lower side of the imaging device 100) at a wide angle so as to display the image in a wide range from a forward just near position to a distant position of the vehicle.

Therefore, an idea has been proposed for picking up the image in the visual field direction on the forward slanting lower side of the imaging device 100 at a wide angle by setting the entire view angle of the image pickup lens 129 to a wide angle by using a wide angle lens as the image pickup lens 129.

However, in the above proposal, the pickup images are set to wide angles for the upper side area Vu (i.e., the visual field ranges in the visual field directions on both the forward left and right sides of the imaging device 100) as well as the lower side area Vd of the vertical view angle V of the image pickup lens 129 (i.e., the visual field range in the visual field direction on the forward slanting lower side of the imaging device 100). Therefore, the images are picked up at wide angles for the pickup images in the visual field directions (i.e., both the forward left and right side directions of the vehicle) on both the forward left and right sides of the imaging device 100 as well as the pickup image in the visual field direction on the forward slanting lower side of the imaging device 100. Therefore, the above proposal has disadvantages in that an approaching object displayed in the pickup images in both the forward left and right side directions of the vehicle is displayed as a small object.

SUMMARY OF THE INVENTION

It is therefore an object of the invention is to provide an imaging device able to pick up images at wide angles in partial visual field directions among plural visual field directions and simultaneously pick up images at non-wide angles in the remaining visual field directions by a simple construction using the single image pickup element, and also provide a vehicle circumference visualizing apparatus using the imaging device.

In order to achieve the object, according to a first aspect of the invention, there is provided an imaging device including: an image pickup element configured to simultaneously pick up images in plural visual field directions; an image pickup lens arranged on a front face of the image pickup element; and a first optical element arranged on a front face of the image pickup lens and having a concave lens property, wherein the first optical element guides lights from wide angle ranges in partial visual field directions among the plural visual field directions onto the image pickup element via the image pickup lens.

According to a second aspect of the invention, there is provided a vehicle circumference visualizing apparatus including: an imaging device disposed at a front portion or at a rear portion of a vehicle; an image processing section configured to perform predetermined image processing with respect to an image picked up by the imaging device; and a display device arranged within the vehicle and displaying the image processed by the image processing section, wherein the imaging device includes: an image pickup element configured to simultaneously pick up images in plural visual field directions; an image pickup lens arranged on a front face of the image pickup element; and a first optical element arranged on a front face of the image pickup lens and having a concave lens property, wherein the first optical element guides lights from wide angle ranges in partial visual field directions among the plural visual field directions onto the image pickup element via the image pickup lens.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment and modifications thereof of the invention will be described below with reference to the accompanying drawings.

Figure 1:
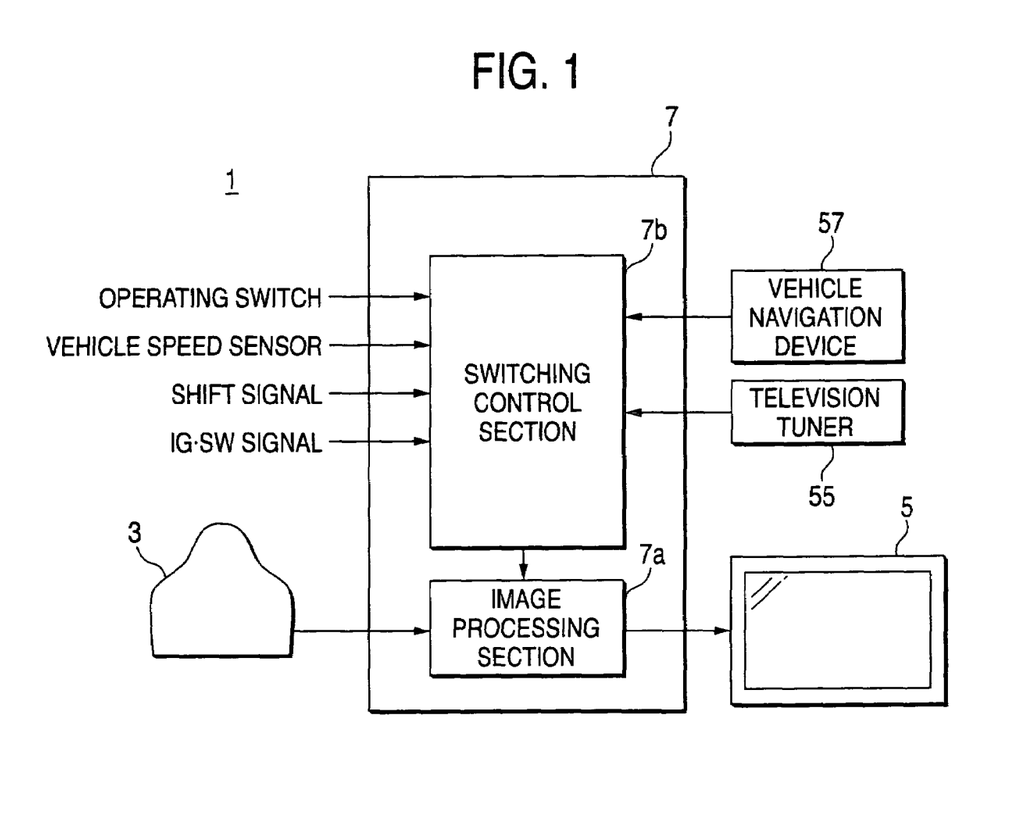
FIG. 1 is a schematic view showing a vehicle circumference visualizing apparatus according to an embodiment of the invention.
Figure 2:
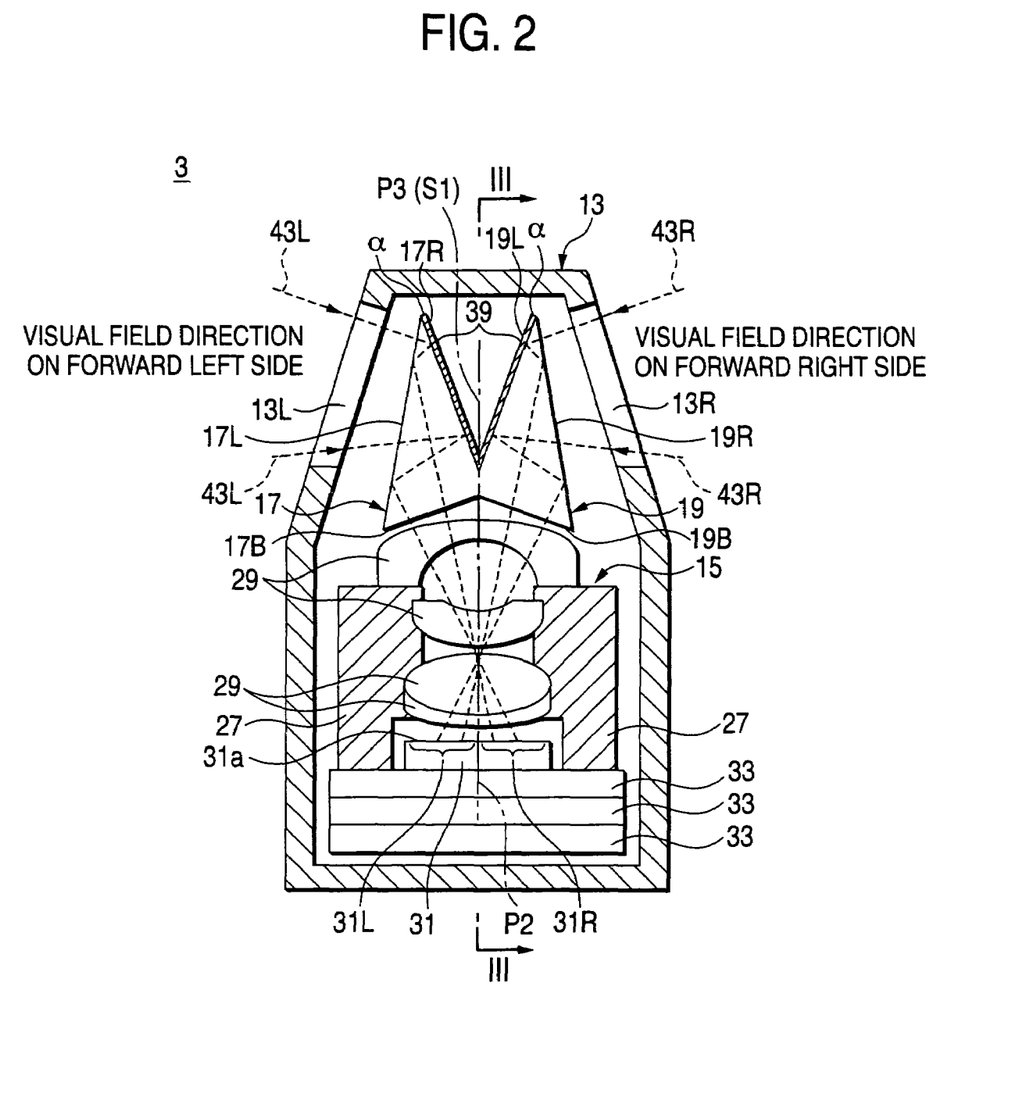
FIG. 2 is a schematic sectional plan view of an imaging device shown in FIG. 1.
Figure 3:
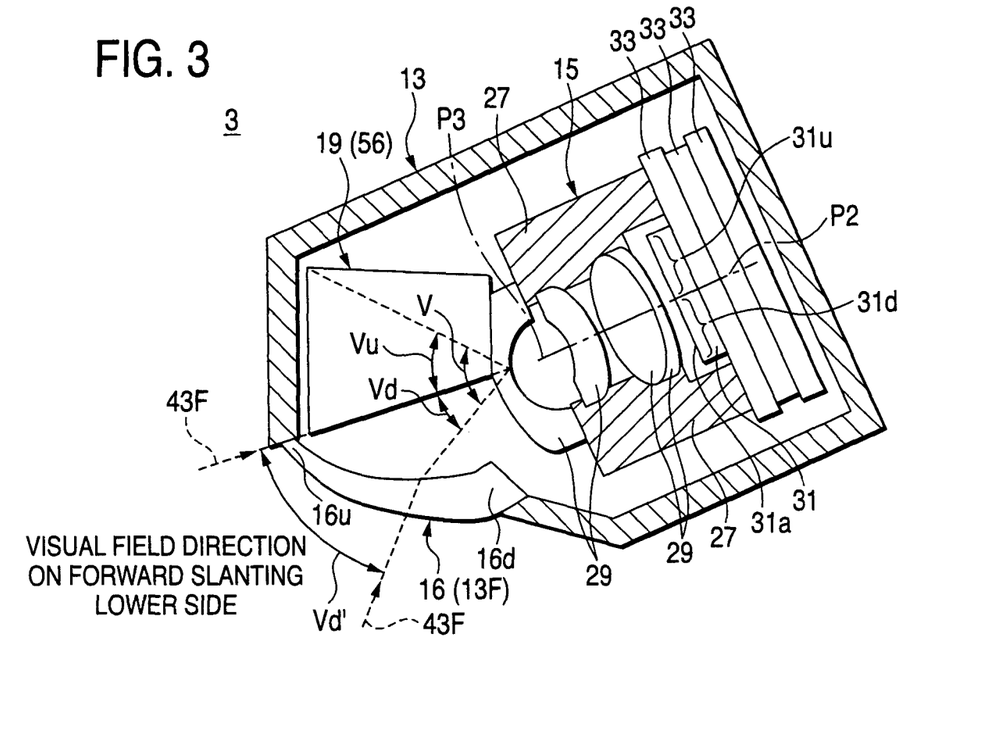
FIG. 3 is a III-III sectional view of each of FIGS. 2 and 9.
Figure 4:
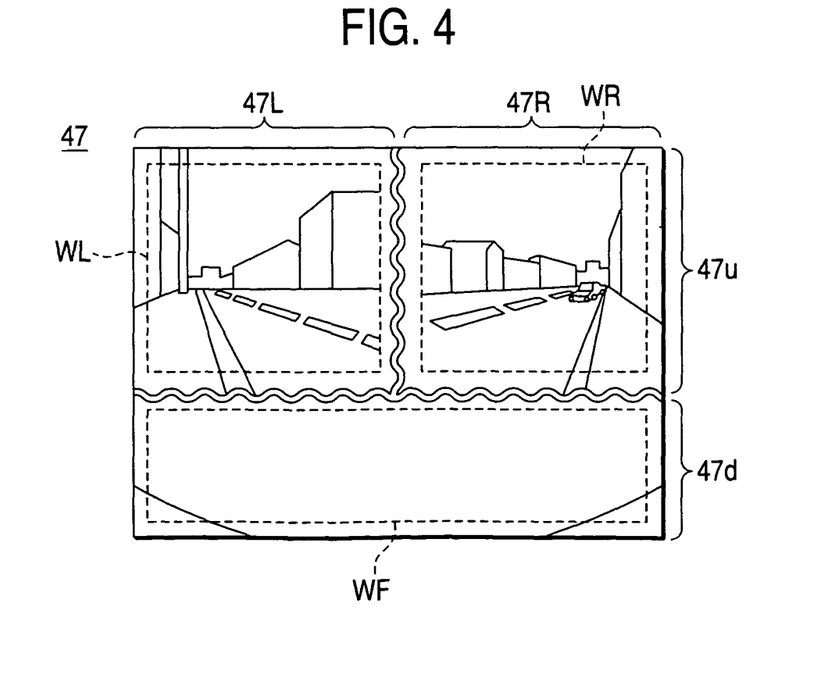
FIG. 4 is a view showing one example of a pickup image of the imaging device shown FIG. 1.
Figure 5:
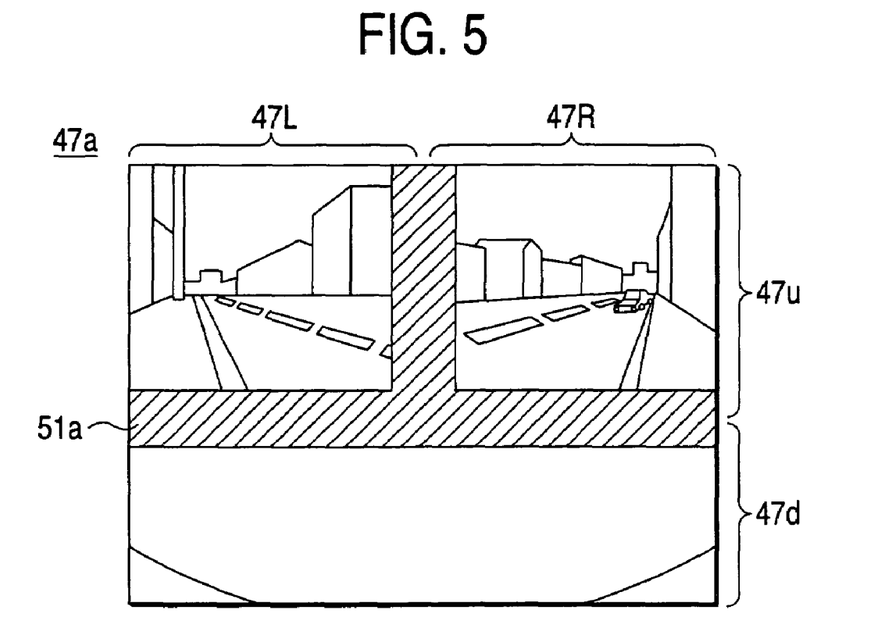
FIG. 5 is a view showing one example of a display image of a display device shown in FIG. 1.
Figure 6:
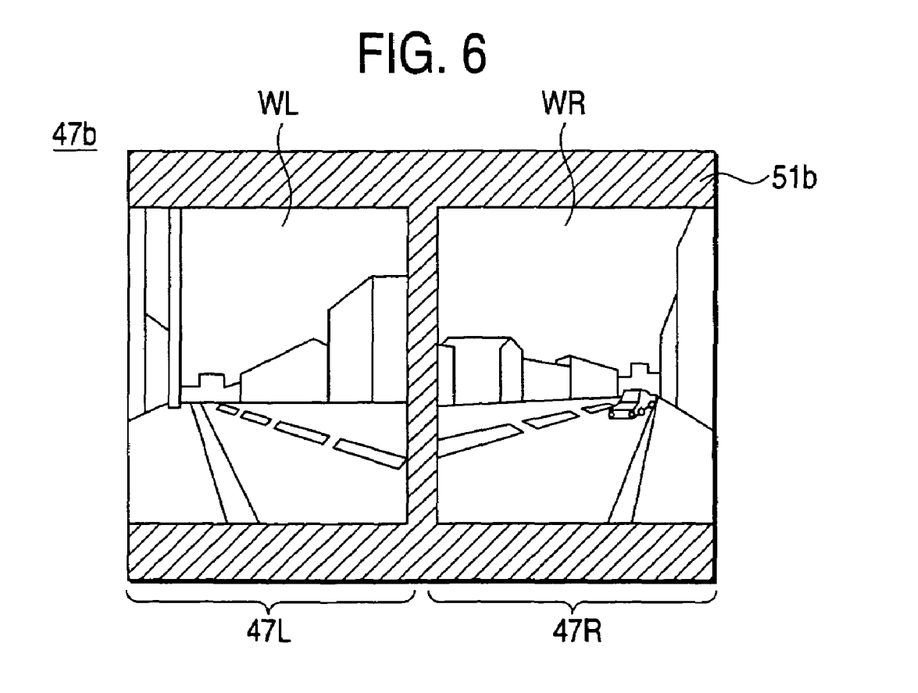
FIG. 6 is a view showing another example of the display image of the display device shown in FIG. 1.
Figure 7:
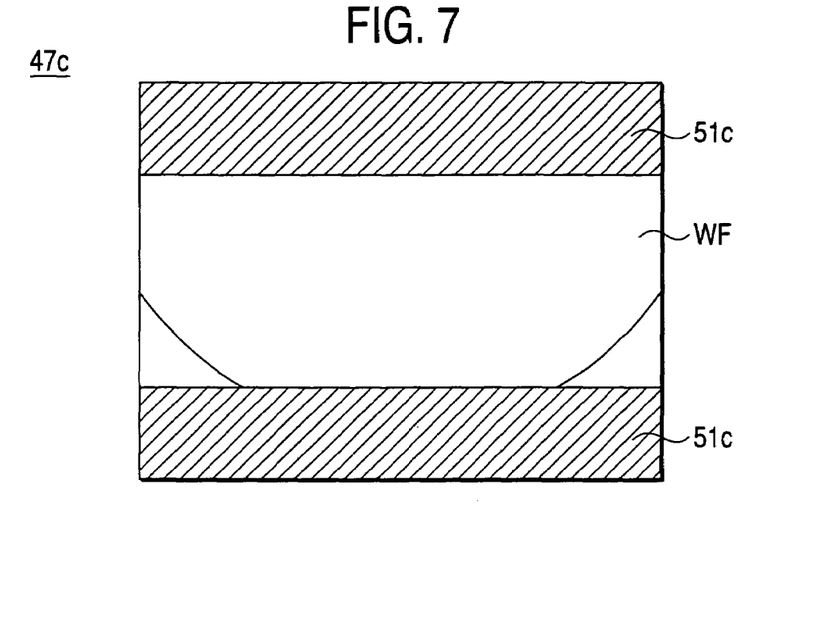
FIG. 7 is a view showing still another example of the display image of the display device shown in FIG. 1.

FIG. 1 is a schematic view showing a vehicle circumference visualizing apparatus according to a preferred embodiment of the present invention. FIG. 2 is a schematic plan view showing the construction of an imaging device shown in FIG. 1. FIG. 3 is a III-III sectional view of FIG. 2. FIG. 4 is a view showing one example of a pickup image of the imaging device of FIG. 1. Each of FIGS. 5 to 7 is a view showing examples of a display image of a display device of FIG. 1.

As shown in FIG. 1, the vehicle circumference visualizing apparatus 1 according to the embodiment has a single imaging device 3 arranged in a front portion of a vehicle (e.g., the portion below a front emblem) and picks up images at dead areas (blind corners) in plural directions around the vehicle. In the embodiment, the imaging device 3 is configured to pick up images of three directions constructed by a straightforward direction and both forward left and forward right side directions of the vehicle. The vehicle circumference visualizing apparatus 1 also has a display device 5 arranged within the vehicle and displays the pickup image of the imaging device 3, and a controller 7 for performing predetermined required image processing with respect to the pickup image of the imaging device 3.

As shown in FIGS. 2 and 3, the imaging device 3 is constructed such that a camera unit 15, a lens (optical element having a concave lens property) 16 for a wide angle pickup image and a pair of left and right prisms (optical elements having no concave lens property) 17, 19 respectively arranged on a front face side of the camera unit 15 are stored and arranged within a light shielding property of a case 13.

The case 13 is formed in a sealed box shape. At least both the left and right side faces and the lower face of a front half portion of the case 13 are slantingly formed inside the case 13. Transparent windows 13L, 13R and 13F each formed by a transparent member are respectively arranged on both of the left and right side faces and the lower face. The transparent members constituting the transparent windows 13L, 13R on both the left and right side faces of the case 13 are formed in a flat plate shape. The transparent member constituting the transparent window 13F on the lower face of the case 13 is formed so as to constitute the lens 16 for a wide angle pickup image.

In the case 13, portions of the transparent windows 13L, 13R, 13F (i.e., 16) and a light shielding portion (oblique line portion) except for the portions of the transparent windows 13L, 13R, 13F are integrally molded by transparent polycarbonate of a weather resisting property grade. Only the light shielding portion is coated with light shielding property paint by masking. The entire surface (the portions of the transparent windows 13L, 13R, 13F and the light shielding portion) of the case 13 is coated with a colorless transparent hard coat (e.g., acrylic based UV hardening type) so that the case 13 is formed. Here, the transparent polycarbonate of a relatively high refractive index of $n_d=1.58$ is used. Thus, the lens 16 for a wide angle pickup image built-in the transparent window 13F can be relatively thinly formed in comparison with a case in which PMMA ($n_d=1.49$) is used as the transparent member. Further, the abrasion resisting property and the weather resisting property of the case 13 are further improved by coating the case 13 with the hard coat. The case 13 is constructed such that the case 13 is divided into a case main body and a cover body in a predetermined portion, and an unillustrated waterproof structure such as a sealant is arranged in a joining portion of the case main body and the cover body. The waterproof property of the case 13 is secured by the waterproof structure.

The camera unit 15 is constructed such that an image pickup lens 29, a single image pickup element 31 such as a CCD element and a processing circuit 33 such as a driving circuit of the image pickup element 31 are stored and arranged within a holder (tube body) 27.

For example, the image pickup lens 29 is constructed as a composite lens. In the embodiment, a horizontal view angle of the image pickup lens 29 is set to 80 degrees, and the vertical view angle of the image pickup lens 29 is set to 60 degrees. Since the horizontal view angle of the image pickup lens 29 is set to 80 degrees, a proximate object displayed in the pickup images in both the forward left and right side directions of the imaging device 3 is largely displayed so that the visibility of the pickup images in both the forward left and right side directions of the imaging device 3 is improved in comparison with a case in which a super wide angle lens is used as the image pickup lens 29. The image pickup element 31 is arranged behind the image pickup lens 29 right in front in a state in which the vertical central axis P2 of an image pickup face 31a of the image pickup element 31 is conformed to the lens central axis (optical axis) P3 of the image pickup lens 29.

The camera unit 15 is arranged by inclining an image pickup direction thereof (i.e., the lens central axis P3 direction of the image pickup lens 29) downward at a predetermined angle (e.g., at 12.5 degrees) with respect to the horizontal direction such that the image is appropriately picked up in the visual field direction on the forward slanting lower side of the imaging device 3. In the arranging state, the transparent window 13F (i.e., lens 16 for a wide angle pickup image) of the case 13 is arranged in the lower side area (e.g., lower side 25 degrees area) Vd of a vertical view angle V of the image pickup lens 29. Prisms 17, 19 are arranged in the upper side area (e.g., upper side 35 degrees area) Vu of the vertical view angle V of the image pickup lens 29. Namely, the lens 16 for a wide angle pickup image is arranged so as to occupy only one portion area of the view angle of the image pickup lens 29 corresponding to partial visual field directions (here the visual field direction on the forward slanting lower side) among plural visual field directions of the imaging device 3.

The prisms 17, 19 are arranged so as to occupy only the remaining area of the view angle of the image pickup lens 29 corresponding to the remaining visual field directions (here the visual field directions on both the forward left and right sides) among the plural visual field directions of the imaging device 3.

As mentioned above, the lens 16 for a wide angle pickup image is assembled into the transparent window 13F of the case 13 and is also used as a transparent member constituting the transparent window 13F and is arranged in the case 13.

The lens 16 for a wide angle pickup image is formed in a concave lens shape in section so as to have a circumferential edge contour having about the same shape and size as the circumferential edge contour (e.g., rectangular shape) of the transparent window 13F of the case 13, and has a property of a so-called wide conversion lens. More specifically, in the lens 16 for a wide angle pickup image, for example, as shown in FIG. 3, the center of its upper side portion 16u is thinnest, and the lens 16 is gradually thickly formed from the center of its upper side portion 16u toward the circumferential edge portions of three sides constructed by its lower side portion 16d side and both its left and right portion sides. The entire lens 16 is formed so as to be curved out in a curved surface shape such as a spherical surface shape, etc. toward the outer surface side (the outside of the case 13) (in other words, the lens 16 is formed in a shape in which the upper half portion of a concave lens such as a negative meniscus lens is cut and removed.)

Since the lens 16 for a wide angle pickup image having the shape is arranged in the lower side area Vd of the vertical view angle V of the image pickup lens 29, the visual field range (the range corresponding to the lower side area Vd of the vertical view angle V of the image pickup lens 29) in the visual field direction on the forward slanting lower side of the imaging device 3 is not enlarged on its upper side and becomes a wide visual field enlarged on both its left and right sides and the lower side. In the embodiment, the vertical view angle Vd' (i.e., the lower side area Vd of the vertical view angle V of the image pickup lens 29) of the visual field range in the visual field direction on the forward slanting lower side of the imaging device 3 is enlarged to 1.6 times from 25 degrees to 40 degrees. The vertical view angle Vd' is a wide visual field having about the same extent as the case that the image pickup lens having a horizontal view angle of 128 degrees is used.

Since the lens 16 for a wide angle pickup image is arranged in the lower side area Vd of the vertical view angle V of the image pickup lens 29, the focal length of the image pickup lens 29 is changed. As a result, an image face in the visual field direction on the forward slanting lower side of the imaging device 3 and image faces in the visual field directions on both the forward left and right sides may be shifted and defocused. However, the defocusing would not to be a practical problem in the embodiment by using an image pickup lens having a short focal length and a deep focal depth (i.e., a wide focusing range) as the image pickup lens 29.

As shown in FIGS. 2 and 3, the pair of left and right prisms 17, 19 are approximately formed in a triangle pole shape with mutual mirror image symmetry. With respect to the left (right) prism 17 (19), its left (right) prism side face 17L (19B) and its prism rear face 17B (19B) are held as transmission faces. A metallic layer 39 made of metal such as aluminum is evaporated on its right (left) prism side face 17R (19L) such that its inner face becomes a reflecting face (mirror face). Further, an unillustrated protecting film using black paint is formed so as to cover the evaporation face.

Each of the prisms 17, 19 is arranged such that a vertical angle α thereof is directed to the front side with respect to the left (right) prism 17 (19), and the left (right) prism side face 17L (19R) faces the left (right) transparent window 13L (13R) of the case 13, and prism rear face 17B (19B) faces the image pickup lens 29. The prisms 17, 19 are mutually arranged with face symmetry on left and right bisectional faces S1 of the image pickup lens 29 on the front face side of the image pickup lens 29. Both the prisms 17 and 19 are held and arranged in vertical postures and are also arranged by cutting and removing a portion (here a portion having a depression angle of 17.5 degrees or less forward from the height position of an entrance pupil of the image pickup lens 29) projected to the lower side area Vd of the vertical view angle V of the image pickup lens 29 among these prism portions so as to lie within the upper side area Vu of the vertical view angle V of the image pickup lens 29.

The image pickup of the imaging device 3 will now be explained hereinafter.

As shown in FIG. 3, light 43F from a wide angle range in the visual field direction (i.e., the forward slanting lower side direction of a vehicle) on the forward slanting lower side of the imaging device 3 is transmitted through the transparent window 13F of the case 13, and is refracted by the lens 16 for a wide angle pickup image assembled into the transparent window 13F, and is guided to the image pickup lens 29 side. The light 43F then passes through the lower side area Vd of the vertical view angle V of the image pickup lens 29, and is directly incident to the image pickup lens 29. The light 43F is then converged by the image pickup lens 29 and is formed as an inverted mirror image in the upper half area 31u of an image pickup face 31a of the image pickup element 31. Thus, the image is picked up by the image pickup element 31 in a state in which the dead areas in the forward slanting lower side direction of the vehicle is a wide angle (i.e., in the wide range from a forward just near position to a distant position of the vehicle).

Simultaneously, as shown in FIG. 2, light 43L (43R) from a non-wide angle range in the visual field direction (i.e., the forward left (right) side direction of the vehicle) on the forward left (right) side of the imaging device 3 is transmitted through the transparent window 13L (13R) of the case 13, and is incident to the left (right) prism side face 17L (19R) in the left (right) prism 17 (19). The light 43L (43R) is then reflected on the inner face on the right (left) prism side face 17R (19L) within the left (right) prism 17 (19), and is next reflected on the inner face on the left (right) prism side face 17L (19R). Thus, the light is inverted twice in total on the inner faces and is emitted from the prism rear face 17B (19B). Thereafter, the light passes through the upper side area Vu of the vertical view angle V of the image pickup lens 29, and is incident to the image pickup lens 29. The light is then converged by the image pickup lens 29 and is formed as an inverted mirror image (similar to light 43F from the visual field direction on the forward slanting lower side of the imaging device 3) in the right (left) half area 31R (31L) of a lower half area 31d of the image pickup face 31a of the image pickup element 31. Thus, the image is picked up by the image pickup element 31 such that the dead areas in both the forward left and the forward right side directions of the vehicle are non-wide angles. Namely, an approaching object displayed in the pickup images in both the forward left and right side directions of the vehicle is largely displayed.

Thus, the respective images are simultaneously picked up by the single image pickup element 31 such that the dead areas in the forward slanting lower side direction of the vehicle is a wide angle, and the dead areas in both the forward left and right side directions of the vehicle are non-wide angles.

As shown in FIG. 4, the pickup image picked up by the image pickup element 31 is corrected by a processing circuit 33 to a pickup image 47 in which a pickup image portion in the forward left side direction is arranged as an erecting orthoscopic image in a left half area 47L in its upper half area 47u, and the-pickup image in the forward right side direction is arranged as an erecting orthoscopic image in a right half area 47R in the upper half area 47u of the pickup image 47, and the pickup image on the forward slanting lower side is arranged as an erecting orthoscopic image in a lower half area 47d of the pickup image 47. The corrected pickup image is outputted to a controller 7. In the embodiment, with respect to the pickup image of the image pickup element 31, entire area of the pickup image is collectively inverted to an inverted mirror image and is corrected to the pickup image 47.

The controller 7 has an image processing section 7a for making a pickup image for display by performing predetermined required image processing with respect to the pickup image 47 from the imaging device 3, and a switching control section 7b for switching and controlling the display of the pickup image for display made in the image processing section 7a to a display device 5.

The image processing section 7a performs image processing in which at least one of the processings of cutting-out, enlargement and rearrangement of a pickup image portion and synthesis of a mask image in each visual field direction with respect to the pickup image 47 from the imaging device 3 are combined. The image processing section 7a then selectively makes one pickup image for display assigned by commands of the switching control section 7b or the commands of an operating switch among pickup images 47a, 47b and 47c for display in the composition of FIGS. 5 to 7.

Namely, when the image processing section 7a makes the pickup image (i.e., the pickup image for display obtained by simultaneously displaying the pickup images in three directions constructed by the forward slanting lower side direction and both the forward left and right side directions of the vehicle) 47a for display in the composition of FIG. 5, the image processing section 7a synthesizes a mask image 51a in an unnecessary area of the pickup image 47 from the imaging device 3 and thus manufactures the pickup image 47a for display. For example, in the pickup image 47a for display of FIG. 5, the mask image 51a of an inverted T-shape is synthesized so as to cover the boundary portion of the upper half area 47u and the lower half area 47d of the pickup image 47, and cover the boundary portion of the left half area 47L and the right half area 47R in the upper half area 47u of the pickup image 47. Image processing of enlargement, etc. of a pickup image portion in each visual field direction may be also combined in accordance with necessity.

On the other hand, when the image processing section 7a makes the pickup image (i.e., the pickup image for display obtained by simultaneously displaying only the pickup images in two directions constructed by both the forward left and right side directions of the vehicle) 47b for display in the composition of FIG. 6, as shown in FIG. 6, the image processing section 7a cuts out predetermined ranges WL, WR of pickup image portions in the forward left and right side directions among the pickup image 47 from the imaging device 3, and respectively enlarges these cut-out image portions in predetermined enlargement ratios (here e.g., in the longitudinal direction). The image processing section 7a then synthesizes the enlarged image portions on the left half area 47L and the right half area 47R of the pickup image 47b for display. Further, the image processing section 7a synthesizes (rearranges) a mask image 51b in an unnecessary area of the pickup image 47b for display, and thus makes the pickup image 47b for display. In the pickup image 47b for display of FIG. 6, for example, the mask image 51b of a transversally inverted H-shape is synthesized so as to cover the boundary portion of the left half area 47L and the right half area 47R of the pickup image 47b for display, and an upper side portion and a lower side portion thereof.

On the other hand, when the image processing section 7a makes the pickup image (i.e., the pickup image for display obtained by displaying only the pickup image in one direction constructed by the forward slanting lower side direction of the vehicle) 47c for display in the composition of FIG. 7, as shown in FIG. 7, the image processing section 7a cuts-out a predetermined range WF of the pickup image portion in the forward slanting lower side direction among the pickup image 47 from the imaging device 3, and enlarges the cut-out image portion in a predetermined enlargement ratio (here for example, in the longitudinal direction), and arranges the enlarged image portion in the central area of the pickup image 47c for display and synthesizes the image. Further, the image processing section 7a synthesizes a mask image 51c in an unnecessary area of the pickup image 47c for display, and thus makes the pickup image 47c for display. In the pickup image 47c for display of FIG. 7, for example, the mask image 51c is synthesized so as to cover the upper side portion and the lower side portion of the pickup image 47c for display.

In particular, in the pickup images 47a, 47b for display of FIGS. 5 and 6, the pickup image portions in the respective visual field directions are partitioned by their mask images 51a, 51b, and the discrimination property of the pickup image portions in the respective visual field directions is improved.

The image processing section 7a selectively switches one of the pickup images 47a, 47b, 47c for display made in the image processing section 7a, a television image described later from the switching control section 7b, and a navigation image by the control of the switching control section 7b, and displays the selected image in the display device 5.

The switching control section 7b selectively switches one of the pickup images 47a, 47b, 47c for display made in the image processing section 7a, the television image received by a television tuner 55 and the navigation image obtained from a vehicle navigation device 57, and displays the selected image in the display device 5 by controlling the operation of the image processing section 7a manually on the basis of an operating signal from the operating switch, or automatically on the basis of vehicle information such as a vehicle speed sensor, a shift signal, an ignition switch signal (e.g., IG-SW signal).

The vehicle navigation image may be synthesized in the pickup image (including the pickup images 47a, 47b, 47c for display) of the imaging device 3, and may be simultaneously displayed in the display device 5. For example, when the pickup images in both the forward left and right side directions of the vehicle and the navigation image are combined and are simultaneously displayed in the display device 5, the vehicle navigation image instead of the pickup image in the forward slanting lower side direction is synthesized in the lower half area 47d of the pickup image 47a for display as one example with reference to FIG. 5, and is displayed in the display device 5. When the vehicle navigation image is synthesized in the pickup image of the imaging device 3 and is simultaneously displayed in the display device 5 in the way, navigation information can be also displayed in the display device 5 together with a dead areas image around the vehicle.

In accordance with the vehicle circumference visualizing apparatus 1 constructed as above, the optical element (lens for a wide angle pickup image) 16 having a concave lens property and the optical elements (prisms) 17, 19 having no concave lens property are arranged in front of the image pickup lens 29. Light 43F from a wide angle range in partial visual field directions (the visual field direction on the forward slanting lower side of the imaging device 3) among plural visual field directions is guided to the image pickup lens 29 side by the optical element 16 having the concave lens property, and is formed as an image in the image pickup element 31 through the image pickup lens 29. Lights 43L, 43R from a non-wide range in the remaining visual field directions (the visual field directions on both the forward left and right sides of the imaging device 3) among the plural visual field directions are guided to the image pickup lens 29 side by the optical elements 17, 19 having no concave lens property, and are formed as images in the image pickup element 31 through the image pickup lens 29. Therefore, the images can be picked up at wide angles with respect to the partial visual field directions among the plural visual field directions, and can be simultaneously picked up at non-wide angles with respect to the remaining visual field directions by a simple construction using the single image pickup element 31.

In particular, the optical element 16 having the concave lens property is arranged within the lower side area Vd of the vertical view angle V of the image pickup lens 29, and guides light 43F to the image pickup lens 29 side from the visual field direction on the forward slanting lower side of the imaging device 3, and forms the light 43F as an image in the image pickup element 31 through the image pickup lens 29. The optical elements 17, 19 having no concave lens property are arranged within the upper side area Vu of the vertical view angle V of the image pickup lens 29, and guide lights 43L, 43R to the image pickup lens 29 side from the visual field directions on both the forward left and right sides of the imaging device 3, and form these lights 43L, 43R as images in the image pickup element 31 through the image pickup lens 29. Therefore, the images can be picked up at a wide angle (i.e., in a wide range from a forward just near position to a distant position of the imaging device 3) with respect to the visual field direction on the forward slanting lower side of the imaging device 3, and can be picked up at non-wide angles (i.e., so as to largely display an approaching object) with respect to the visual field directions on both the forward left and right sides of the imaging device 3 by a simple construction using the single image pickup element 31.

Further, the optical elements 17, 19 having no concave lens property are formed as a pair of left and right prisms of a triangle pole. The light 43L (43R) from the visual field direction on the left (right) side of the imaging device 3 is reflected twice on the inner face (i.e., is reflected twice on the mirror face) between both the prism side faces 17L and 17R (19L and 19R) on the visual field direction side and the side opposed to the visual field direction side in the prism 17 (19) within the prism 17 (19) on the visual field direction side, and is guided to the image pickup lens 29 side. Therefore, the lights 43L, 43R from the visual field directions on both the forward left and right sides of the imaging device 3 can be guided to the image pickup lens 29 side without inverting these lights as mirror images. Thus, the pickup images in all the visual field directions of the imaging device 3 can be simultaneously picked up in the same inverting state by the imaging device 3 (i.e., the single image pickup element 31). Thus, the pickup image portions in all the visual field directions on the pickup image of the image pickup element 31 can be corrected to erecting orthoscopic images by performing only collective inversion of all the areas with respect to the pickup image of the image pickup element 31 (i.e., without partially inverting the pickup image).

Further, since the optical element 16 having the concave lens property is formed integrally with the case 13 of the imaging device 3, the optical element 16 having the concave lens property is assembled as the case 13 is assembled at the assembly time of the imaging device 3. Accordingly, the assembly work can be simplified.

Further, the optical element 16 having the concave lens property is assembled into the transparent window of the case 13 of the imaging device 3, and is also used as a transparent member constituting the transparent window is 13F. Therefore, the arranging space of the optical element 16 having the concave lens property can be omitted, and the case 13 is made compact and the degree of flexibility of the case shape is improved.

Further, in the case 13 of the imaging device 3, portions of its transparent windows 13F, 13L, 13R and a light shielding portion except for the portions of these transparent windows 13F, 13L, 13R are integrally molded by the transparent member. Only the light shielding portion is coated with light interrupting property paint. Furthermore, the case 13 is formed by performing hard coat processing in the transparent window portion and its light interrupting property portion. Therefore, the number of parts is reduced and the number of assembly works is reduced, which can contribute to a reduction in cost.

Further, the imaging device 3 is arranged in the front portion of the vehicle, and images at dead areas in three directions constructed by both the forward left and right side directions and the forward slanting lower side direction (forward direction) of the above vehicle can be simultaneously picked up by the imaging device 3. Therefore, the images can be picked up at a wide angle (i.e., in a wide range from a forward just near position to a distant position of the vehicle) with respect to the dead areas in the forward slanting lower side direction of the above vehicle, and can be picked up at non-wide angles (i.e., so as to largely display an approaching object) with respect to the dead areas in both the forward left and right side directions of the above vehicle by a simple construction using the single image pickup element 31.

Further, the image processing section 7a performs image processing in which some of the processings of cutting-out, enlargement and rearrangement of a pickup image portion and synthesis of a mask image in each visual field direction with respect to the pickup image from the imaging device 3 are combined. Therefore, the pickup image in a required visual field direction can be selectively displayed, and the pickup image in each visual field direction can be displayed by the mask image 51 with good visibility. Accordingly, the degree of flexibility and visibility of the composition of the image display are improved.

In the above described embodiment, the explanation is made in the case in which the imaging device 3 is arranged in the front portion of the vehicle and images at dead areas in three directions constructed by both the forward left and right side directions and the forward slanting lower side direction of the vehicle are picked up. However, the present invention is not limited to the embodiment. For example, the present invention can be also applied to a case in which the imaging device 3 is arranged in the rear portion of the vehicle and images at dead areas in three directions constructed by both backward left and right side directions and a backward slanting lower direction of the vehicle are picked up.

FIRST MODIFIED EXAMPLE

Figure 9:
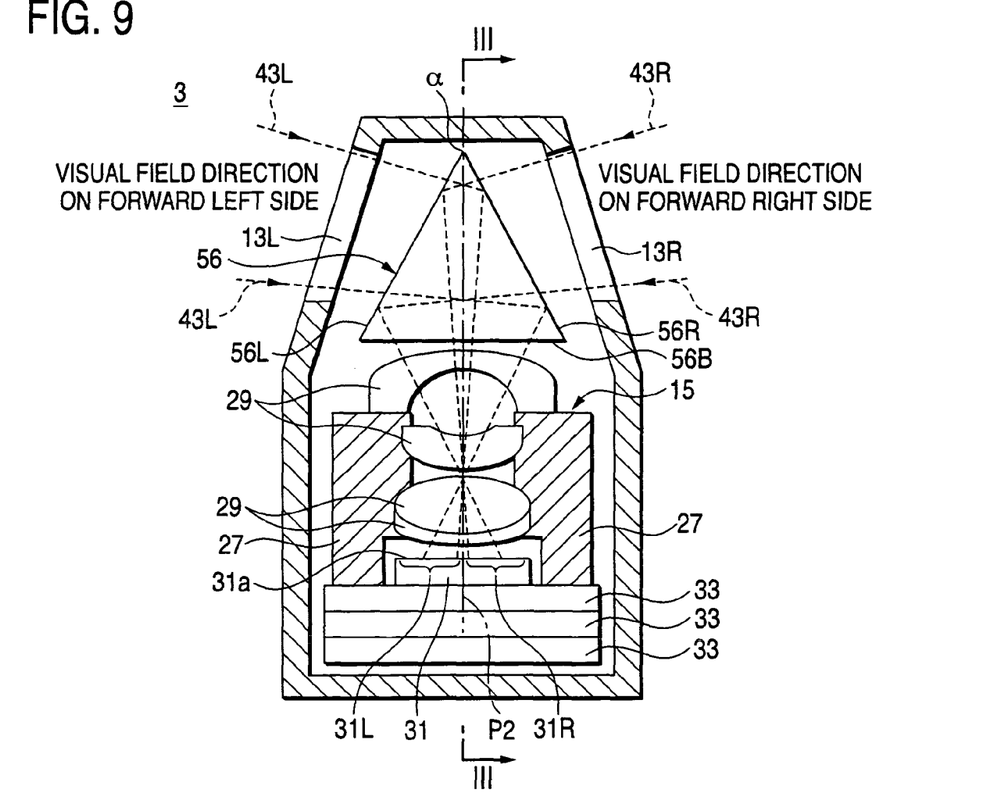
FIG. 9 is a schematic sectional plan view of a first modified example of the imaging device shown in FIG. 1.

FIG. 9 is a schematic sectional plan view of a first modified example of the imaging device shown in FIG. 1. FIG. 3 is a III-III sectional view of FIG. 9.

In the preferred embodiment described above, the explanation is made in the case in which the pair of left and right prisms 17, 19 are used as the optical element having no concave lens property. However, a single prism may be also used instead of the pair of left and right prisms 17, 19. In the first modified example, the single prism 56 is formed in the shape of a triangle pole as shown in FIGS. 3 and 9. Similar to the case of the pair of left and right prisms 17, 19, the single prism 56 is arranged on the front side of the image pickup lens 29 and its portion projected to the lower side area Vd of the vertical view angle V of the image pickup lens 29 is cut and removed so as to lie within the upper side area of the vertical view angle V of the image pickup lens 29 in a state held in a vertical posture so that the single prism 56 is stored and arranged within the case 13. The prism 56 is arranged such that its vertical angle α is directed to the front side and its left (right) prism side face 56L (56R) faces the left (right) transparent window 13L (13R) of the case 13 and its prism rear face 56B faces the image pickup lens 29.

In the first modified example, as shown in FIG. 9, right 43L (43R) from a non-wide angle range in the visual field direction on the forward left (right) side of the imaging device 3 is transmitted through the transparent window 13L (13R) of the case 13 and is incident into the prism 56 from the left (right) prism side face (i.e., the prism side face on the visual field direction side) 56L (56R). The light is then reflected on the inner face on the right (left) prism side face (i.e., the prism side face on the side opposed to the visual field direction) 56R (56L) and is emitted from its prism rear face 17B (19B). Thereafter, the light is incident to the image pickup lens 29 through the upper side area Vu of the vertical view angle V of the image pickup lens 29, and is converged by the image pickup lens 29 and is formed as an inverted orthoscopic image in the left (right) half area 31L (31R) of a lower half area 31d of the image pickup face 31a of the image pickup element 31. On the other hand, light 43F from a wide angle range in the visual field direction on the forward slanting lower side of the imaging device 3 is propagated in an optical path similar to that in the case of the pair of left and right prisms 17, 19, and is formed as an inverted mirror image in an upper half area 31u of the image pickup face 31a of the image pickup element 31. Thus, when the single prism 56 is used, the images are also respectively simultaneously picked up by the single image pickup element 31 at non-wide angles with respect to the visual field directions on both the forward left and right sides of the imaging device 3 and at a wide angle with respect to the visual field direction on the forward slanting lower side of the imaging device 3. Subsequent processing is the same as the case of the preferred embodiment described above except that the image correction of mirror image inversion is made with respect to the pickup images in the visual field directions on both the forward left and right sides formed as inverted orthoscopic images in the image pickup element 31.

Thus, when the single prism 56 is used as the optical element having no concave lens property, it has advantages in that lights 43L, 43R from the visual field directions on both the forward left and right sides of the imaging device 3 can be guided to the image pickup lens 29 side by a very simple construction (by only one prism).

SECOND MODIFIED EXAMPLE

Figure 8:
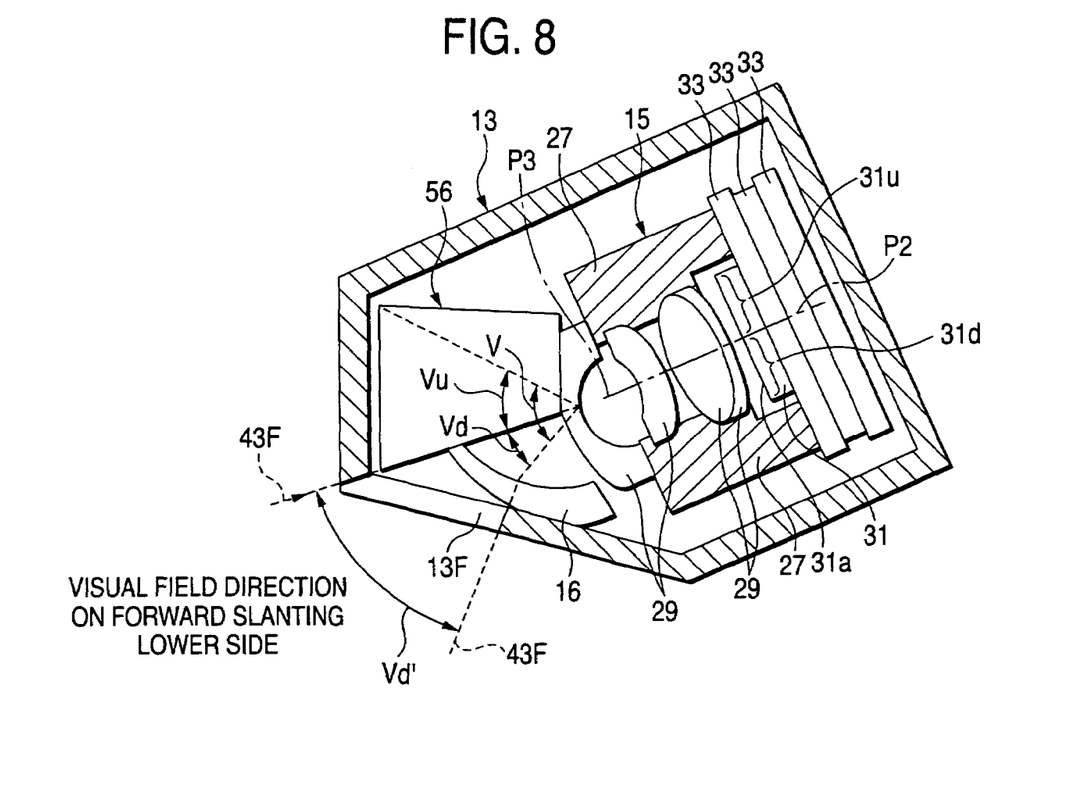
FIG. 8 is a schematic sectional side view of each of a second and a third modified example of the imaging device shown in FIG. 1.

FIG. 8 is a schematic sectional side view of a second modified example of the imaging device shown in FIG. 1.

In the preferred embodiment described above, the explanation is made when the lens 16 for a wide angle pickup image is assembled into the transparent window 13F of the case 13 of the imaging device 3. However, in a case where no lens 16 for a wide angle pickup image is assembled into the transparent window 13F of the case 13, the lens 16 for a wide angle pickup image may be stored and arranged within the case 13 as shown in FIG. 8. Namely, the lens 16 for a wide angle pickup image in the case is located on the rear side of the transparent window 13F of the case 13, and is arranged within the lower side area Vd of the vertical view angle V of the image pickup lens 29 similar to the case of the preferred embodiment described above. Further, the lens 16 for a wide angle pickup image in the case is formed in a shape similar to that in the case of the preferred embodiment described above except that the contour of the lens 16 is not limited to the contour of the transparent window 13F of the case 13 (namely, the lens 16 is formed in a shape in which the upper side portion (unnecessary portion) of a concave lens such as a negative meniscus lens, etc. is cut and removed. In a manufacturing method of the lens 16 for a wide angle pickup image in the case, after the negative meniscus lens is polished, the lens 16 is formed by cutting and removing the unnecessary portion and is assembled into a holder 27.). Similar to the case of the other transparent windows 13L, 13R, the transparent member constituting the transparent window 13F of the case 13 in the case is formed in a flat plate shape. In the second modified example, advantages similar to those in the preferred embodiment are obtained except for the advantages relating to the assembly of the lens 16 for a wide angle pickup image into the transparent window 13F of the case 13 of the imaging device 3.

THIRD MODIFIED EXAMPLE

In the first and the second modified example, the lens 16 for a wide angle pickup image may be also further formed integrally with the prism 17, 19 or 56. Concretely, for example, with reference to FIG. 8, the lens 16 for a wide angle pickup image and the prism 17, 19 or 56 may be integrally formed such that an upper side portion of the lens 16 for a wide angle pickup image and a lower face portion of the prism are joined to each other. Thus, as the prism 17, 19 or 56 is assembled at the assembly time of the imaging device 3, the lens 16 for a wide angle pickup image is also assembled so that the assembly work can be simplified.

FOURTH MODIFIED EXAMPLE

Figure 10:
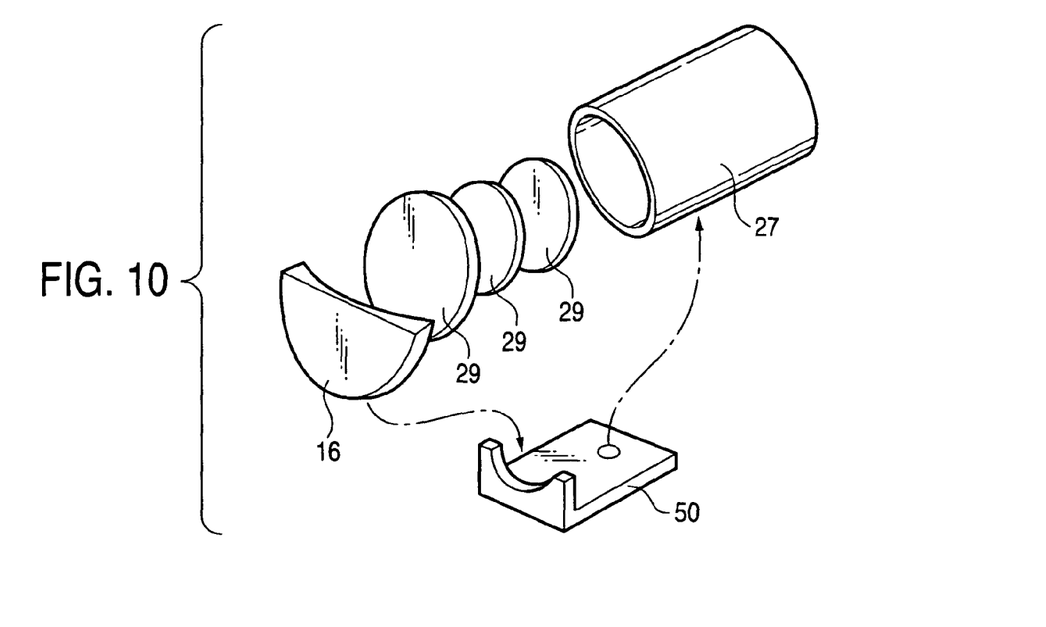
FIG. 10 is a view for explaining a fourth modified example of the imaging device shown in FIG. 1.

In the second modified example, the lens 16 for a wide angle pickup image may be further constructed integrally with the image pickup lens 29 by assembling the lens 16 into the image pickup lens 29 via an assembly member 50. As shown in FIG. 10, in a state in which the lens 16 for a wide angle pickup image is arranged on the most objective side of the image pickup lens 29, the lens 16 for a wide angle pickup image and the image pickup lens 29 may be integrally constructed by assembling the lens 16 for a wide angle pickup image with a holder (tube body) 27 together with the image pickup lens 29 via the assembly member 50. Thus, as the image pickup lens 29 is assembled at the assembly time of the imaging device 3, the lens 16 for a wide angle pickup image is also assembled so that the assembly work can be simplified.

In accordance with the imaging device according to the present invention, an optical element having a concave lens property and an optical element having no concave lens property are arranged on the front face of an image pickup lens. Lights are guided from wide angle ranges in partial visual field directions among plural visual field directions onto said image pickup lens side, and are formed as images in an image pickup element through said image pickup lens by the optical element having the concave lens property. Lights are guided from non-wide angle ranges in the remaining visual field directions among the plural visual field directions onto said image pickup lens side, and are formed as images in said image pickup element through said image pickup lens by the optical element having no concave lens property. Therefore, the images can be picked up at wide angles with respect to the partial visual field directions among the plural visual field directions and can be simultaneously picked up at non-wide angles with respect to the remaining visual field directions by a simple construction using the single image pickup element.

In accordance with the imaging device according to the present invention, the optical element having the concave lens property is arranged within the lower side area of a vertical view angle of the image pickup lens and guides light from the visual field direction on the forward slanting lower side of the imaging device onto said image pickup lens side, and forms the light as an image in said image pickup element through said image pickup lens. The optical element having no concave lens property is arranged within the upper side area of the vertical view angle of said image pickup lens, and guides lights from the visual field directions on both the left and right sides of the imaging device onto said image pickup lens side, and forms these lights as images in said image pickup element through said image pickup lens. Therefore, the images can be picked up at a wide angle with respect to the visual field direction on the forward slanting lower side of the imaging device and at non-wide angles with respect to the visual field directions on both the left and right sides of the imaging device by the single image pickup element.

In accordance with the imaging device according to the present invention, the optical element having no concave lens property is formed as a pair of left and right prisms of a triangle pole, and lights from the visual field directions on both the left and right sides of the imaging device are respectively reflected twice on the inner face (i.e., are reflected twice on a mirror face) between both the prism side faces on the visual field direction side in its prisms and the side opposed to the visual field direction side within said prisms on its visual field direction side, and are then guided to the image pickup lens side. Therefore, the lights from the visual field directions on both the left and right sides can be guided to the image pickup lens side without inverting these lights as mirror images. Thus, the pickup images in all the visual field directions of the imaging device can be simultaneously picked up in the same inverting state by the imaging device (i.e., the single image pickup element). Accordingly, pickup image portions in all the visual field directions of the pickup image of the image pickup element can be corrected to erecting orthoscopic images by performing only collective inversion of all areas with respect to the pickup image of the image pickup element (i.e., without performing partial inversion).

In accordance with the imaging device according to the present invention, the optical element having no concave lens property is formed as a single prism of a triangle pole. Therefore, the lights from the visual field directions on both the left and right sides can be guided to the image pickup lens side by a simple construction.

In accordance with the imaging device according to the present invention, the optical element having the concave lens property is formed integrally with said optical element having no concave lens property. Therefore, as the optical element having no concave lens property is assembled at the assembly time of the imaging device, the optical element having the concave lens property is also assembled so that the assembly work can be simplified.

In accordance with the imaging device according to the present invention, the optical element having the concave lens property is assembled into said image pickup lens by an assembly member and is constructed integrally with said image pickup lens. Therefore, as the image pickup lens is assembled at the assembly time of the imaging device, the optical element having the concave lens property is also assembled so that the assembly work can be simplified.

In accordance with the imaging device according to the present invention, the optical element having the concave lens property is formed integrally with the case of the imaging device. Therefore, as the case is assembled at the assembly time of the imaging device, the optical element having the concave lens property is also assembled so that the assembly work can be simplified.

In accordance with the imaging device according to the present invention, the optical element having the concave lens property is assembled into a transparent window of the case of the imaging device, and is also used as a transparent member constituting the transparent window. Therefore, the arranging space of the optical element having the concave lens property can be omitted so that the case is made compact and the degree of flexibility of the case shape is improved.

In accordance with the imaging device according to the present invention, the case of the imaging device is formed such that its transparent window portion and a light shielding portion except for its transparent window portion are integrally molded by the transparent member, and only the light shielding portion is coated with light interrupting property paint, and hard coat processing is performed in its transparent window portion and the light interrupting property portion. Therefore, the number of parts is reduced and the number of assembly works is reduced, which can contribute to a reduction in cost.

In accordance with the vehicle circumference visualizing apparatus according to the present invention, the imaging device according to the present invention is arranged in the front portion or the rear portion of a vehicle and images are simultaneously picked up by the imaging device at dead areas in three directions constructed by both the left and right side directions and the forward or backward direction of said vehicle. Therefore, the images can be picked up at non-wide angles with respect to the dead areas in both the left and right side directions of the vehicle, and at a wide angle with respect to the dead areas in the forward or backward direction of the vehicle by a simple construction using the single image pickup element.

In accordance with the vehicle circumference visualizing apparatus according to the present invention, the image processing means performs image processing in which some of the processings of cutting-out, enlargement and rearrangement of a pickup image portion and synthesis of a mask image in each visual field direction with respect to the pickup image of the imaging device are combined. Therefore, the pickup image in a required direction can be selectively displayed and the pickup image in each direction can be displayed by the mask image with good visibility so that the degree of flexibility of the composition of the image display is improved and visibility is improved.

In accordance with the vehicle circumference visualizing apparatus according to the present invention, the image processing means further synthesizes a vehicle navigation image in the pickup image (dead areas image) of the imaging device, and simultaneously displays the synthesized image in a display device. Therefore, navigation information can be also simultaneously displayed in the display device together with the dead areas image around the vehicle.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. An imaging device comprising:
    a window that transmits incident light into the imaging device, the incident light including a plurality of incident light rays;
    an image pickup element configured to simultaneously pick up images in plural visual field directions;
    an image pickup lens disposed, in a light path of incident light transmitted through the window, between the window and a front face of the image pickup element;
    a first optical element disposed, in the light path of incident light transmitted through the window, between the window and a front face of the image pickup lens and having a concave lens property; and
    a second optical element arranged on the front face of the image pickup lens and having no concave lens property,
    wherein the first optical element guides lights from wide angle ranges in partial visual field directions among the plural visual field directions onto the image pickup element via the image pickup lens,
    wherein the second optical element guides lights from non-wide angle ranges in the remaining visual field directions among the plural visual field directions onto the image pickup element via the image pickup lens, and
    wherein each of the plurality of incident light rays that is transmitted through the window is only guided through one of the first optical element and the second optical element.

2. The imaging device as claimed in claim 1, wherein the first optical element is arranged within lower area of a vertical view angle of the image pickup lens and guides light from the visual field direction of a forward slanting lower direction to the imaging device onto the image pickup element via the image pickup lens, and
    wherein the second optical element is arranged within upper area of the vertical view angle of the image pickup lens and guides lights from the visual field directions of both left side and right side directions of the imaging device onto the image pickup element via the image pickup lens.

3. The imaging device as claimed in claim 1, wherein the second optical element comprises a pair of left and right prisms each having a triangle pole shape, and
    wherein each of the left and right prisms guides the incident light from the respective visual field directions incident from a side face arranged on the visual field direction side onto the image pickup element via the image pickup lens after reflecting the incident light twice on inner prism faces thereof.

4. The imaging device as claimed in claim 1, wherein the second optical element is formed as a single prism having a triangle pole shape.

5. The imaging device as claimed in claim 1, wherein the first optical element is formed integrally with the second optical element.

6. The imaging device as claimed in claim 1 further comprising an assembly member configured to assemble the first optical element with the image pickup lens.

7. The imaging device as claimed in claim 1 further comprising a case having light shielding property and having a transparent portion configured to take in the lights from the plural visual field directions.

8. The imaging device as claimed in claim 7, wherein the first optical element is formed integrally with the case.

9. The imaging device as claimed in claim 7, wherein the transparent portion comprises a transparent member attached to the case.

10. The imaging device as claimed in claim 7, wherein the transparent portion comprises an opening formed on the case.

11. The imaging device as claimed in claim 7, wherein the case is formed of a transparent material and comprises a light shielding portion in which coated with a light shielding member having light shielding property.

12. The imaging device as claimed in claim 7, wherein a hard coating processing is performed on at least the transparent portion of the case.

13. The imaging device as claimed in claim 7, wherein the transparent portion comprises the first optical element.

14. The imaging device as claimed in claim 1, wherein the imaging device is disposed at a front portion or at a rear portion of a vehicle, and
    wherein the imaging device is configured to simultaneously pick up image of dead areas in three directions of both left side and right side directions and forward or backward direction of the vehicle.

15. A vehicle circumference visualizing apparatus comprising:
    an imaging device disposed at a front portion or at a rear portion of a vehicle;
    an image processing section configured to perform predetermined image processing with respect to an image picked up by the imaging device; and
    a display device arranged within the vehicle and displaying the image processed by the image processing section,
    wherein the imaging device comprises:
    a window that transmits incident light into the imaging device, the incident light including a plurality of incident light rays;
    an image pickup element configured to simultaneously pick up images in plural visual field directions;
    an image pickup lens disposed, in the light path of incident light transmitted through the window, between the window and a front face of the image pickup element;
    a first optical element disposed, in the light path of incident light transmitted through the window, between the window and a front face of the image pickup lens and having a concave lens property;
    a second optical element arranged on the front face of the image pickup lens and having no concave lens property, and
    wherein the first optical element guides lights from wide angle ranges in partial visual field directions among the plural visual field directions onto the image pickup element via the image pickup lens,
    wherein the second optical element guides lights from non-wide angle ranges in the remaining visual field directions among the plural visual field directions onto the image pickup element via the image pickup lens, and wherein each of the plurality of incident light rays that is transmitted through the window is only guided through one of the first optical element and the second optical element.

16. The vehicle circumference visualizing apparatus as claimed in claim 15, wherein the image processing section performs at least one of the processings of cutting-out, enlarging, rearranging and image combining of the pickup image in each direction.

17. The vehicle circumference visualizing apparatus as claimed in claim 15, wherein the image processing section performs combining a vehicle navigation image to the image pick up by the imaging device.

18. An imaging device comprising:
an image pickup element configured to simultaneously pick up images in plural visual field directions;
an image pickup lens arranged on a front face of the image pickup element; and
a first optical element arranged on a front face of the image pickup lens and having a concave lens property,
a second optical element arranged on the front face of the image pickup lens and having no concave lens property, wherein the first optical element guides lights from wide angle ranges in partial visual field directions among the plural visual field directions onto the image pickup element via the image pickup lens, wherein the second optical element guides lights from non-wide angle ranges in the remaining visual field directions among the plural visual field directions onto the image pickup element via the image pickup lens, wherein the first optical element is arranged within lower area of a vertical view angle of the image pickup lens and guides light from the visual field direction of a forward slanting lower direction to the imaging device onto the image pickup element via the image pickup lens, and wherein the second optical element is arranged within upper area of the vertical view angle of the image pickup lens and guides lights from the visual field directions of both left side and right side directions of the imaging device onto the image pickup element via the image pickup lens.

* * * * *